United States Patent
Xia et al.

(10) Patent No.: US 11,808,737 B2
(45) Date of Patent: Nov. 7, 2023

(54) ULTRASONIC SYSTEM AND METHOD FOR NON-INTRUSIVE DETECTION AND MEASUREMENT OF IMPURITIES IN MULTIPHASE FLOWS

(71) Applicant: X-Wave Innovations, Inc., Gaithersburg, MD (US)

(72) Inventors: Lang Xia, Gaithersburg, MD (US); Dan Xiang, Gaithersburg, MD (US)

(73) Assignee: X-Wave Innovations, Inc., Gaithersburg, MD (US)

( * ) Notice: Subject to any disclaimer, the term of this patent is extended or adjusted under 35 U.S.C. 154(b) by 112 days.

(21) Appl. No.: 17/516,763

(22) Filed: Nov. 2, 2021

(65) Prior Publication Data

US 2023/0139882 A1 May 4, 2023

(51) Int. Cl.
*G01N 29/46* (2006.01)
*G01N 29/024* (2006.01)
*G01F 1/66* (2022.01)
*G01F 1/667* (2022.01)
(Continued)

(52) U.S. Cl.
CPC ............. *G01N 29/46* (2013.01); *G01F 1/662* (2013.01); *G01F 1/667* (2013.01); *G01N 29/024* (2013.01); *G01N 29/343* (2013.01); *G01N 29/4427* (2013.01); *G01N 2291/02433* (2013.01); *G01N 2291/105* (2013.01)

(58) Field of Classification Search
CPC ............... G01N 29/024; G01N 29/343; G01N 29/4427; G01N 29/46; G01N 2291/02433; G01N 2291/105; G01F 1/662; G01F 1/667
See application file for complete search history.

(56) References Cited

U.S. PATENT DOCUMENTS 5,594,165 A * 1/1997 Madanshetty ......... G01N 15/06
                                                   73/64.53
6,128,949 A * 10/2000 Kleinberg ........... E21B 49/0875
                                                   73/61.79

(Continued)

OTHER PUBLICATIONS

Blander, Milton & Katz, Joseph L. (1975), Bubble Nucleation in Liquids (pp. 833-848). AiChE Journal, vol. 21, No. 5.

(Continued)

*Primary Examiner* — Benjamin R Schmitt
(74) *Attorney, Agent, or Firm* — Sheets Law PLLC; Kendal M. Sheets (57) ABSTRACT

The technology of the invention relates to an ultrasonic characterization method for a flowstream to detect impurities that can include placing a first transducer and a second transducer aligned confocally to a flowstream, transmitting, from the first transducer, ultrasonic waveform signals into the flowstream, receiving, by the second transducer, the ultrasonic waveform signals, removing waveform signal reflections using a pitch-catch configuration of the first transducer and the second transducer, detecting waveform signals indicating impurities in the flowstream using induced nucleation of the impurities, detecting waveform signals indicating bubbles in the flowstream using nonlinear dynamic behaviors of the bubbles, and differentiating between the waveform signals of the impurities and the waveform signals of the bubbles using cavitation properties of the impurities and the bubbles.

10 Claims, 5 Drawing Sheets

(51) Int. Cl.
      *G01N 29/44* (2006.01)
      *G01N 29/34* (2006.01)

(56) References Cited

U.S. PATENT DOCUMENTS

| | | | |
|---|---|---|---|
| 2002/0194907 A1* | 12/2002 | Bostrom | E21B 43/12 73/152.58 |
| 2008/0041163 A1* | 2/2008 | Tohidi | G01N 25/147 73/659 |
| 2014/0127082 A1* | 5/2014 | Van Doorn | B01F 31/87 422/310 |

OTHER PUBLICATIONS

Bremond, N., Arora, M., Ohl, C. & Lohse, D. (2006) Controlled Multibubble Surface Cavitation (pp. 224501-1 to 224501-4). Physics of Fluids, University of Twente, Enschede, The Netherlands.

Qi, Y., Klausner, J., & Mei R. (2004), Role of Surface Structure in Heterogeneous Nucleation (pp. 3097-3107). International Journal of Heat and Mass Transfer 47, Department of Mechanical and Aerospace Engineering, University of Florida, Gainesville, FL.

Xia, L., Karandish, F., Kumar, K., Froberg, J., Kulkarni, P., Gange, K., Choi, Y., Mallik, S., & Sarkar, K. (2018), Acoustic Characterization of Echogenic Polymersomes Prepared from Amphiphilic Block Copolymers (pp. 447-457). Ultrasound in Medicine & Biology, vol. 44, Issue 2, World Federation for Ultrasound in Medicine and Biology.

* cited by examiner

ULTRASONIC SYSTEM AND METHOD FOR NON-INTRUSIVE DETECTION AND MEASUREMENT OF IMPURITIES IN MULTIPHASE FLOWS

FIELD OF INVENTION

The disclosure relates to the technical field of sensing, detecting, and differentiating impurities in single phase or multiphase flows that occur inside flowstreams such as a pipe or pipeline, in a non-intrusive manner. Impurities can include, but are not limited to, sands and other suspended particulates in the flowstream.

BACKGROUND

Ultrasonic technology is a nondestructive and quantitative tool used in academia, industry, and many other areas to measure flow rate in a pipeline, image the microstructures and evaluate the mechanical properties of materials, as well as to inspect flaws or defects without causing any damage to the structures or materials. Impurities, such as sands, in crude oils are of major practical concerns in the transport and processing of the crude oil in the modern petroleum industry. The presence of impurities in the flow can cause rapid erosion and wear of equipment such as chokes, valves, and flow-lines, inducing serious safety and environment risks. In addition, impurities may cause serious formation of damage to a pipeline raising expenses of replacing equipment due to early failures. Rapid detection or measurements of impurities such as sands in the crude oil is necessary to prevent failures of the equipment and the cumulative damage to pipelines.

Ultrasonic/acoustic signals are usually generated and detected by using focused or planar transducers. When the impinging ultrasound propagates through a medium, the amplitude and phase information in the received ultrasonic signals are dependent upon the medium properties. If impurities exist in the medium, the property's variation results in acoustic impedance mismatch at the boundaries of impurities, where the reflection or scattering of the ultrasound occurs, depending on the size of the impurities. This is the basic principle for most ultrasonic flow characterization and nondestructive evaluation (NDE). However, due to the great difference in signal amplitudes scattered by bubbles and sands or other impurities, for example, conventional ultrasound is not capable of distinguishing signals of sands from those of bubbles in the crude oil flowstream.

According to the theories of bubble dynamics and Rayleigh scattering, when the diameter of a bubble is much smaller than the wavelength of impinging ultrasound, the scattering signal from the bubble is three orders stronger than those from sands of a similar size. This indicates that the sand signals would be completely masked by the bubble signals in the crude oil. Therefore, conventional ultrasonic techniques that are based on sound speed, attenuation, or scattering measurements are incompetent in detecting the sand or other impurities signals with the presence of small bubbles. So far, no effective, non-intrusive method has been found for detecting impurities, such as sands, in multiphase flow with the presence of bubbles.

SUMMARY

The current invention overcomes deficiencies identified above with an ultrasonic method and system that can detect impurities inside a flow system, such as pipeline, in a nonintrusive manner and without altering the structure and physical properties of the system. Equipment using ultrasonic technology allows a small footprint and rapid inspection. Additionally, ultrasonic methods and systems of the embodiments are cost-effective and do not require specially trained professionals to operate.

In one aspect, an ultrasonic characterization method for a flowstream to detect impurities can include placing a first transducer and a second transducer aligned confocally to a flowstream, transmitting, from the first transducer, ultrasonic waveform signals into the flowstream, receiving, by the second transducer, the ultrasonic waveform signals, removing waveform signal reflections using a pitch-catch configuration of the first transducer and the second transducer, detecting waveform signals indicating impurities in the flowstream using induced nucleation of the impurities, detecting waveform signals indicating bubbles in the flowstream using nonlinear dynamic behaviors of the bubbles, and differentiating between the waveform signals of other impurities and the waveform signals of the bubbles using cavitation properties of the impurities and the bubbles.

In another aspect, an ultrasonic characterization system for a flowstream to detect impurities can include a first transducer and a second transducer aligned confocally to the first transducer around a flowstream, a controller including a processor configured to execute commands to transmit, from the first transducer, ultrasonic waveform signals into the flowstream, receive, by the second transducer, the ultrasonic waveform signals, remove waveform signal reflections using a pitch-catch configuration of the first transducer and the second transducer, detect waveform signals indicating impurities in the flowstream using induced nucleation of the impurities, detect waveform signals indicating bubbles in the flowstream using nonlinear dynamic behaviors of the bubbles, and differentiate between the waveform signals of other impurities and the waveform signals of the bubbles using cavitation properties of the impurities and the bubbles.

BRIEF DESCRIPTION OF THE DRAWINGS

The present embodiments are better understood by reference to the following detailed description when considered in connection with the accompanying drawing, wherein.

DETAILED DESCRIPTION

Various embodiments of the present invention may incorporate one or more of the features described herein. The following detailed description taken in conjunction with the accompanying drawings may provide a better understanding of the nature and advantages of the present invention. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications. While the invention has been described with a certain degree of particularity, it is manifest that many changes may be made in detail of construction and the arrangement of components without departing from the spirit and scope of this disclosure. The present disclosure is to be considered as an exemplification of the principles of the invention and is not intended to limit the invention to the specific embodiments illustrated herein by the figures or description.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Various embodiments described herein provide examples that can be capable of detecting and differentiating phases of solid particles, such as sands, and gas or vapor bubbles in various types of flow systems. For example, one embodiment can provide an efficient, effective, and accurate method to characterize the solid phase in multiphase flows with the presence of a gas phase. The present embodiments will be well-suited to improve the capability of conventional ultrasonic methods for detecting small or weak scatter in liquids, such as weak scatter caused by sands, where signals are currently indistinguishable from basal noises. The embodiments may also be used to quantitatively measure the concentration of impurities such as small particles and sands in liquids. Embodiments can include an ultrasonic method and system for detecting impurities such as sands with a presence of small bubbles of various phases in crude-oil flows in a pipeline. The methods and systems may also be applied to other applications for differentiating particles in single phase and multiphase flows, such as but not limited to assessing small particle concentration in fluids for the food processing, chemical transportation, and water utility industries.

One embodiment is a method and system for detecting solid particles in a liquid flowstream by employing a pair of ultrasonic transducers mounted onto a pipe. This can be accomplished by significantly suppressing or eliminating background noises due to multiple reflections of ultrasound from pipe walls. The impact of impinging ultrasound is minimized by using a pitch-catch configuration. Other methods and system examples may also be used to decrease or reduce the impact of background noises through avoiding the signals of the transmitter and wall reflections. For example, an embodiment to detect gas presence or bubbles in a given medium can manipulate the extrication pressure and frequency of the transducers.

Accordingly, embodiments can provide methods and systems to determine the cavitation threshold of a pure liquid by gradually increasing or decreasing the excitation pressures, which can be accomplished by varying the excitation energy to a pair of ultrasonic transducers serving as a transmitter and a receiver. Signals from the transmitting transducer can have a significant impact on the cleanliness of ultrasonic signals in the receiving transducer. When the signals from a target are weak, the impinging ultrasound makes a significant difference in the interpretation of the target signals. For example, in an ultrasonic microstructure characterization of a metal, the backscattering (grain noises) signal from the metal is employed. This backscattering can only be observed when the received signals are amplified more than 30 dB. In such amplification, the impinging waveform received by the receiver overshadows a large part of the scattering signals. In other words, most of the information from scatterings in the medium is lost in the detection system.

The current disclosure embodied in the examples aims to eliminate, or at least partially eliminate, this type of transmitter's effect for NDE by providing a confocal pitch-catch configuration using two or more focused transducers mounted externally on a flow pipe. The plane of confocal configuration can be arranged in parallel with or perpendicularly to the long axis of a pipe. An angle between the two transducers can be in a range approximately between zero and ninety degrees to avoid the impact from the wave field of the impinging ultrasound (including the sidelobe) and multiple reflections from the pipe wall. However, a skilled artisan will recognize that the angle measurements cited above could vary due to variations in a flow stream system such as flow stream orientation, materials of construction of a pipe, limitations of external access to the flow channel, etc., and could still function according to the embodiments. In some embodiments, the methods and systems disclosed herein could function in a partially exposed flowstream so long as the transducers could be mounted external to the flowstream in a confocal configuration and could send and receive ultrasonic signals. For example, transducers could be mounted inside of a flowstream structure in a confocal configuration but outside of the liquid flow itself.

Some embodiments include a function for sweeping pressure amplitude and/or excitation frequency using transmitting transducers. The sweeping function can include an algorithm to synchronize the impinging ultrasound with the receiving signals to accurately determine the correlation between the scattering signals and the pressure amplitudes. The operation of pressure sweeping may be in a pulse-echo system or pitch-catch system. Various examples of the present disclosure can depict the manipulation of acoustic signals in the ultrasonic system. In these embodiments, pressure and frequency sweeping may be performed separately.

The embodiments can utilize digital signal processing schemes such as nonlinear curve-fitting and the Fast Fourier Transform (FFT). The FFT may be performed immediately after recording the time-domain waveforms of pressure-dependent scattering, and compared subsequently with the results from the time-domain analysis.

Some embodiments may consist of ultrasonic transducers, a computation unit, a software package, and visualization display. Confocal ultrasonic transducers, data acquisition cards, data analysis algorithms, and data output interfaces may also be included. Specific variations of the embodiments may include a software package that consists of automatic or manual pressure and frequency sweeping functions, a data analysis module, and/or signal synchronization. Various types of ultrasound systems may be used synergistically, such as ultrasonic tomography, scanning acoustic microscopy, medical ultrasound imaging, nondestructive testing, and laser-ultrasound. Thus, an apparatus, software package, or algorithm that can be implemented by existing signal processing software, such as Matlab, Octave, and Python or integrated into embed Linux or UNIX systems, and future-developed software, which can control the transducers and analyze collected data.

Figure 1:
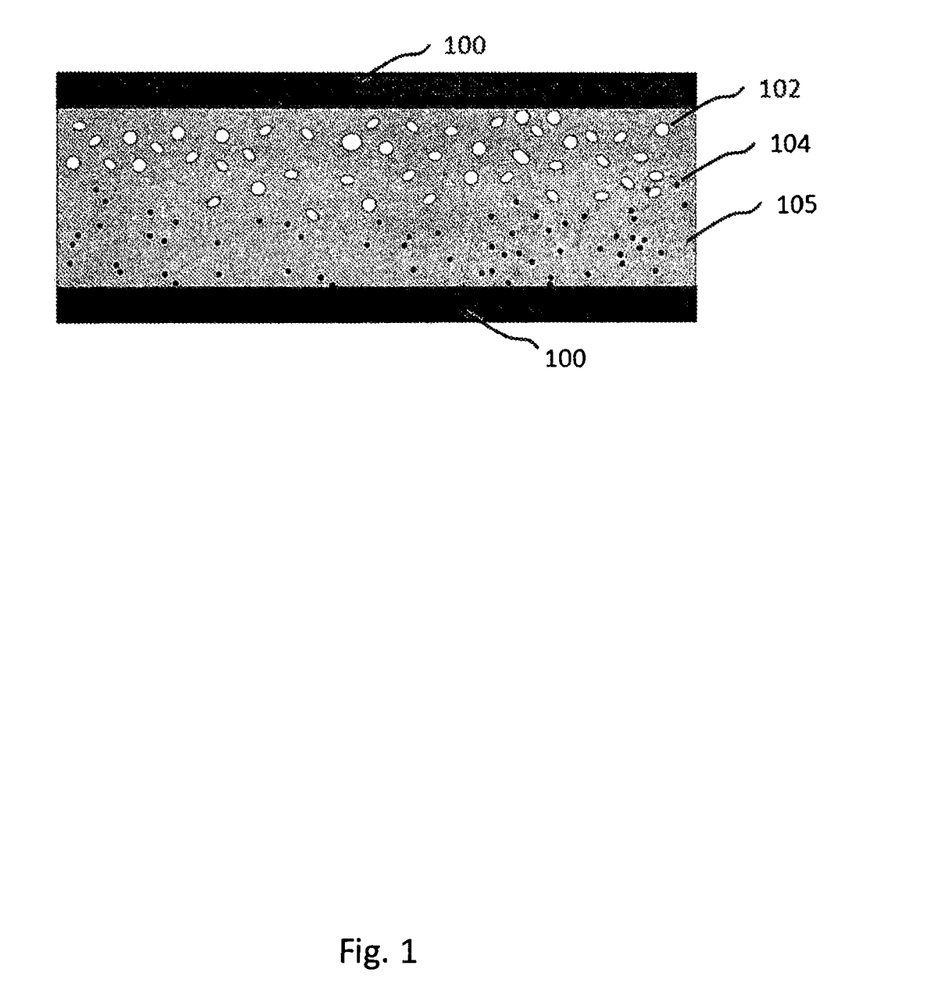
FIG. 1 illustrates an example of a lateral cross-section of a crude oil pipeline containing multiphase flows.

FIG. 1 illustrates an example of a lateral cross-section of a crude oil pipeline containing multiphase flows. In FIG. 1, exemplary pipe walls 100 are show in cross-section. Within pipe walls 100, bubbles 102, sands 104, and a host liquid 105 can form a multiphase flow that has complex physical and acoustic properties. In one embodiment, the method and system can detect and differentiate between impurities such as sands and bubbles in a crude oil pipeline. However, the multiphase flow is not limited to the bubbles, sands, and a particular host liquid. Any complex flow stream containing small impurities and bubbles of different phases can be considered as multiphase flows.

Figure 2A:
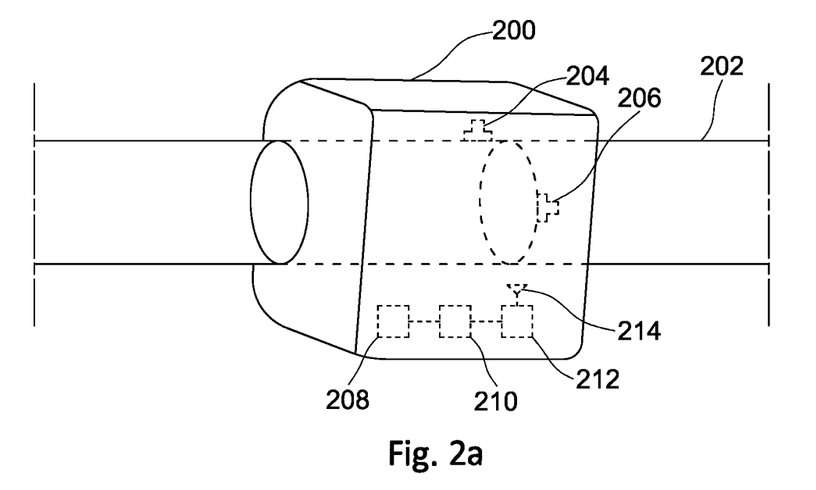
FIG. 2a illustrates an impurities detection system and its configuration according to the embodiments.
Figure 2B:
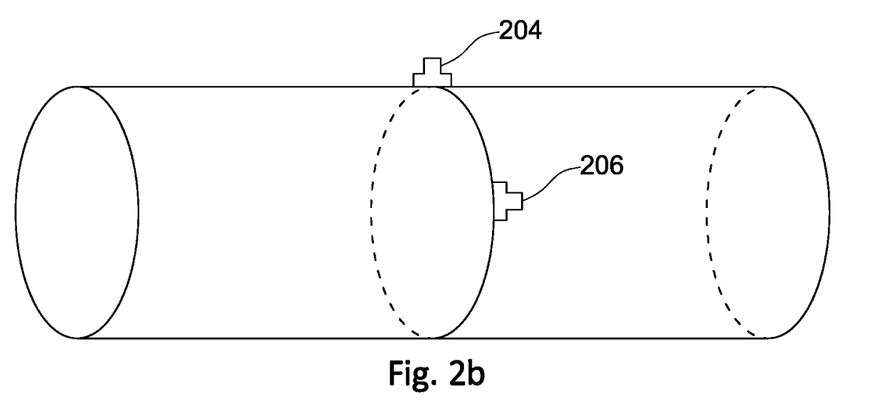
FIG. 2b illustrates a more detailed view of transducer locations for the impurities detection system of FIG. 2a according to the embodiments.

In an embodiment, FIG. 2a and FIG. 2b depict aspects of an ultrasonic flow evaluation/characterization system according to the embodiments. FIG. 2a illustrates an impurities detection system and its configuration according to the embodiments. A mounting device 200 may be clamped on or otherwise fastened to a pipeline 202. The pipeline 202 is exemplary of a flowstream and can have a cylindrical cross-section similar to the pipe shown in FIG. 1. Alternatively, the pipeline 202 can have a rectangular, square or irregular-shaped cross-section. In other embodiments, the pipeline 202 could be a flow channel in devices associated with a pipeline such as a fitting, valve, pump, drain, junction, etc. In some embodiments, the pipeline 202 could be a tube, tank, or any device or equipment capable of creating a flow channel that can receive a flow stream. The mounting device 200 is preferably adjustable such that it can fasten or couple to various geometric configurations of flow pipes, channels, fittings, valves, etc., described above and known in the art.

The mounting device 200 can include at least two integrated broadband ultrasonic transducers. A first transducer 204 and a second transducer 206 can have, for example, a given central frequency ranging from tens of KHz to MHz. A skilled artisan will recognize that other frequency ranges of the first transducer 204 and the second transducer 206 may be possible to function with the embodiments. In some embodiments, additional transducers may be placed around the pipeline 202 via the mounting device 200 or other coupling or fastening devices.

The mounting device 200 can also include a pulser/receiver 208 along with an analog-to-digital (A/D) converter 210 to perform ultrasonic signal excitation, amplification, and data acquisition. In one embodiment, the mounting device 200 can also include a controller module 212 that can include a single board PC with a processor and memory, a power supply, an integrated wireless transceiver 214, and application software. The memory may store instructions that, when executed by the processor, may cause the control and analysis of ultrasonic signals to and from the first transducer 204 and the second transducer 206. Other computer and processor configurations for the mounting device 200 are possible according to known and future-developed technologies. The controller module 212 can provide computational power for data processing and management. The wireless transceiver 214 or dedicated wired connections can allow the controller module 212 to operatively communicate with and control transducers 204 and 206, pulser/receiver 208, and the analog-to-digital (A/D) converter. The wireless transceiver 214 can also allow the controller module 212 to output data to wireless receivers such as mobile devices or network access points. The application software can be executed by the controller module processor and can include data analysis algorithms and executable commands to control the devices integrated with or operationally communicating with the controller module 212. Although FIG. 2a shows the pulser/receiver 208, analog-to-digital (A/D) converter 210, controller module 212, and wireless transmitter 214 integrated with or connected to mounting device 200, these elements could be located outside of or separately from mounting device 200 and the first transducer 204 and the second transducer 206 and continue to operatively communicate with the transducers.

FIG. 2b illustrates a more detailed view of transducer locations for the impurities detection system of FIG. 2a according to the embodiments. The configuration of the first transducer 204 and the second transducer 206 in the mounting device 200 can be aligned confocally. The confocal alignment between the first transducer 204 and the second transducer 206 shown in FIG. 2b is exemplary and can vary according to the embodiments. In one embodiment, a confocal alignment between the first transducer 204 and the second transducer 206 can vary between zero and ninety degrees. This type of alignment can avoid or minimize the major signals emitted by a transmitter on each transducer and thus increases the signal to noise ratio in the received major signals. Each of the first transducer 204 and the second transducer 206 can send and receive acoustic signals, depending on the actual applications. When the first transducer 204 operates as the transmitter of ultrasonic signals, the second transducer 206 operates as the receiver of the ultrasonic signals. The system may also operate in reverse, where the second transducer 206 operates as the transmitter of ultrasonic signals and the first transducer 204 operates as the receiver of the ultrasonic signals. In some embodiments, the first and second transducers 204, 206 respectively, may be unfocused, spherical-focused, or line-focused transducers. Other embodiments can use alternative transducers known in the art or future developed that may function according to the embodiments described herein. Hence, the acoustic/ultrasonic waves generated by the first or second transducer 204, 206 may be planar, spherical, or cylindrical waves. In addition, an excitation pressure generated by the first transducer 204 or the second transducer 206 can be controlled by the controller 212 of the mounting device 200 automatically, which can be increased or decreased during measurements. The controller 212 may contain a processor and memory with software instructions that can be executed by the processor to perform the functions and calculations described herein. The pressure sweeping function of the mounting device 200 can make it possible to differentiate the bubble and sand signals in oil flows.

Figure 3:
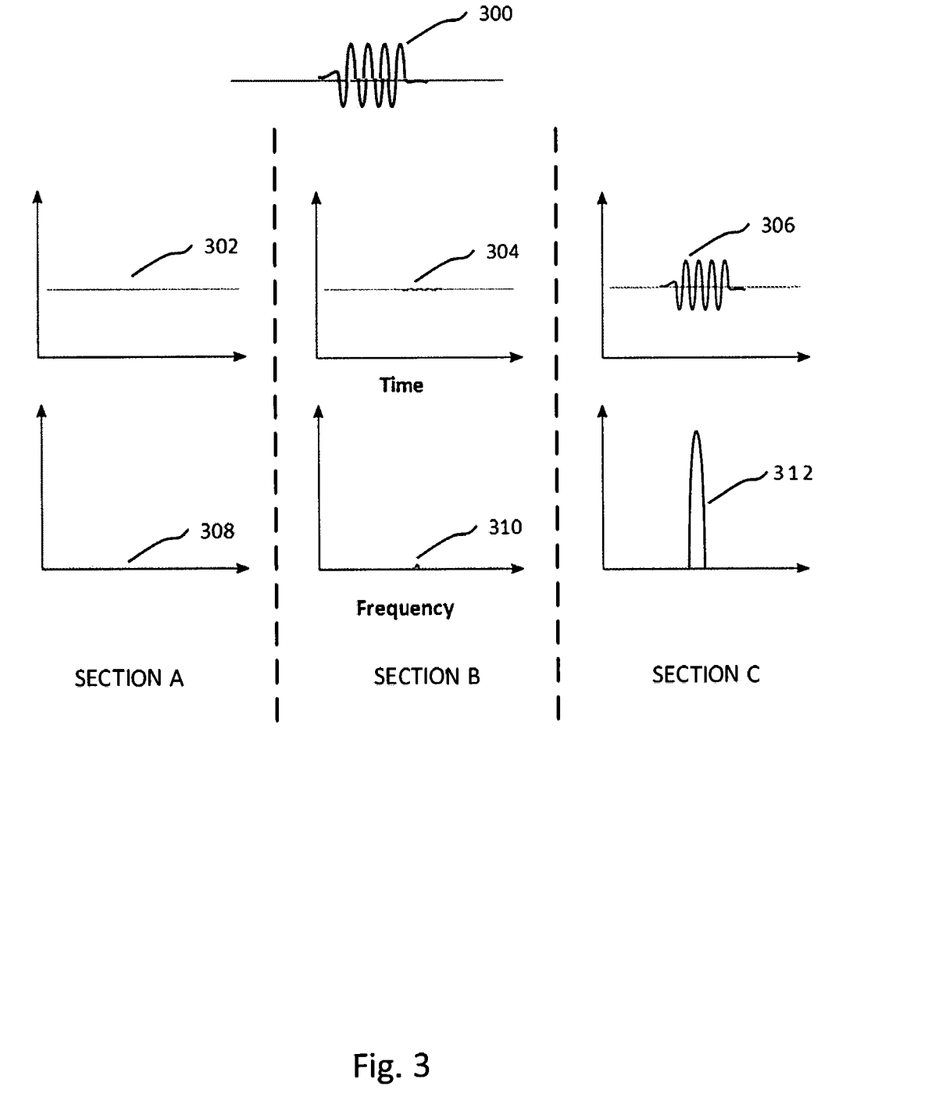
FIG. 3 illustrates graphs of scattered waveforms and the corresponding power spectra in the frequency domain from flowstreams of single phase liquid, liquid with sands, and liquid with bubbles according to the embodiments.

FIG. 3 illustrates graphs of scattered waveforms from data collected by the controller module 212 processor and the corresponding power spectra in the frequency domain from flow streams of single phase liquid, liquid with sands, and liquid with bubbles according to the embodiments. In each example, the scattered waveforms in the time domain are graphed above the corresponding power spectra in the frequency domain that were converted by Fast Fourier transforms (FFT) by controller module 212 processor or a remote processor in a computer. The waveform 300 is an excitation pressure emitted by a transmitting transducer (e.g., first transducer 204). When the excitation pressure propagates through a pure single phase liquid in column section A, no scatter signal 302 is recorded by the receiving transducer (e.g., second transducer 206). When the excitation pressure propagates through a liquid containing solid particles, of which the diameters are much smaller than the wavelength of the pressure, the scattered signal can be calculated by the following formula:

$$P_s = -P_I \frac{k^2 a}{3}\left[1 - \frac{3}{2}\cos\theta\left(1 + \frac{i}{kr}\right)\right]\frac{\exp(ikr)}{r} \quad (1)$$

In Formula (1) above, $P_I$ is the incident pressure, k is the wavenumber, a is the radius of the solid scatter, θ is the scattering angle, and r is the distance to the scatter. This is called Rayleigh scattering. The magnitude of the scattered waves is primarily determined by the acoustic impedance mismatch between the liquid and solid. This Rayleigh scattering signal is typically weak as depicted in graph 304 of Section B in FIG. 3 for multiphase flow of liquids with sands.

When the excitation pressure propagates through liquid containing bubbles, of which the diameters are much smaller than the wavelength of the pressure, the scattered signal 310 can be calculated by $$P_s = -\frac{\rho R}{r}\left[2\left(\frac{dR}{dt}\right)^2 + R\frac{d^2R}{dt^2}\right] \quad (2)$$

In Formula (2) above, R is the instantaneous radius of the bubble solved from the following Rayleigh-Plesset equation:

$$\rho\left(R\frac{d^2R}{dt^2} + \frac{3}{2}\left(\frac{dR}{dt}\right)^2\right) + \frac{2\gamma}{R} + \frac{4\mu}{R}\frac{dR}{dt} = p_s - p_\infty \quad (3)$$

In Formula (3) above, ρ is the density of the surrounding liquid, γ is the surface tension, μ is the viscosity of the host liquid, $p_g$ is the pressure inside the bubble, and $p_\infty = p_0 + P_I$ is the ambient pressure in the liquid. The scattering from bubbles is significantly different from the Rayleigh scattering. The magnitude of the scattered waves is mostly determined by the compressibility of the bubble. In FIG. 3, Section C shows charts resulting from measurements of liquids with bubbles. For example, a bubble scattering signal shown in graph 306 is almost 1000 times stronger than that of the Rayleigh scattering. The fast Fourier transform of scattering signals shown in graphs 302, 304, and 306 are illustrated in the corresponding charts of the scattering signal measurements converted to the frequency domain. In Section A, a single liquid phase scattering measurement in the time domain 302 is converted by FFT to frequency domain and shown by graph 308 as being absent. In Section B, a single phase scattering measurement of multiphase flow of liquid and sands shown by graph 304 in the time domain is converted by FFT to frequency domain and shown by graph 310. In Section C, a single phase scattering measurement of multiphase flow of liquid and bubbles shown by graph 306 in the time domain is converted by FFT to frequency domain and shown by graph 312 as bubbles being clearly detected in the liquid flow stream. Therefore, this method provides a definitive way of navigating the scattering signals.

Figure 4:
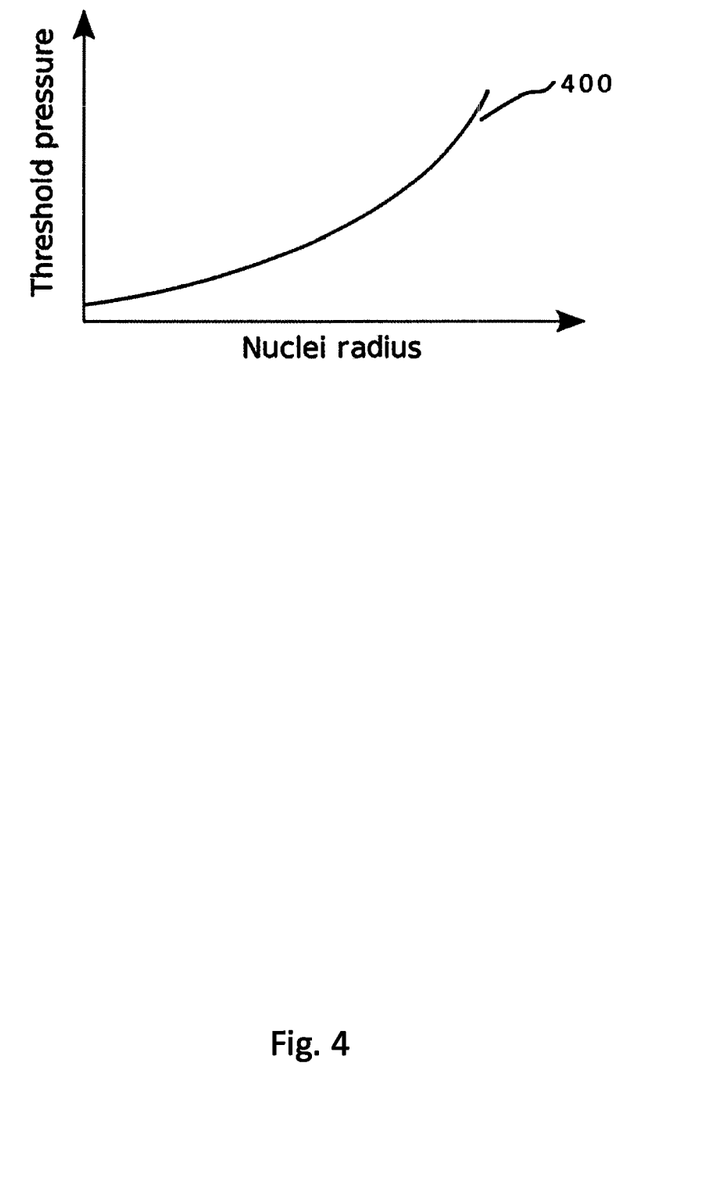
FIG. 4 is a graph that illustrates a relationship between a bubble nuclei radius and the cavitation threshold according to the embodiments.

FIG. 4 is a chart that illustrates a relationship between a bubble nuclei radius and a cavitation threshold according to the embodiments. A relationship between the cavitation threshold and the bubble nuclei radius is depicted in curve 400 and calculated by a theoretical model in the form of:

$$P_c = 4\mu\left[\omega_0^2 - \frac{4\mu^2}{\rho^2 R^2}\right]\left[\left(1 + \frac{\rho\omega_0^2 R^2}{2\gamma}\right)^{1/2} - 1\right] \quad (4)$$

In Formula 4 above, $\omega_0$ is the resonance frequency of the bubble nuclei. These bubble nuclei are the result of the presence of sands or other impurities in the liquids inducing heterogeneous nucleation. Without the presence of sands, the formation of bubble nuclei requires significantly higher excitation pressures since there is no phase boundary for supporting heterogeneous nucleation. The concentration of sands in the liquids can be estimated from the power spectrum of the cavitation threshold.

Figure 5:
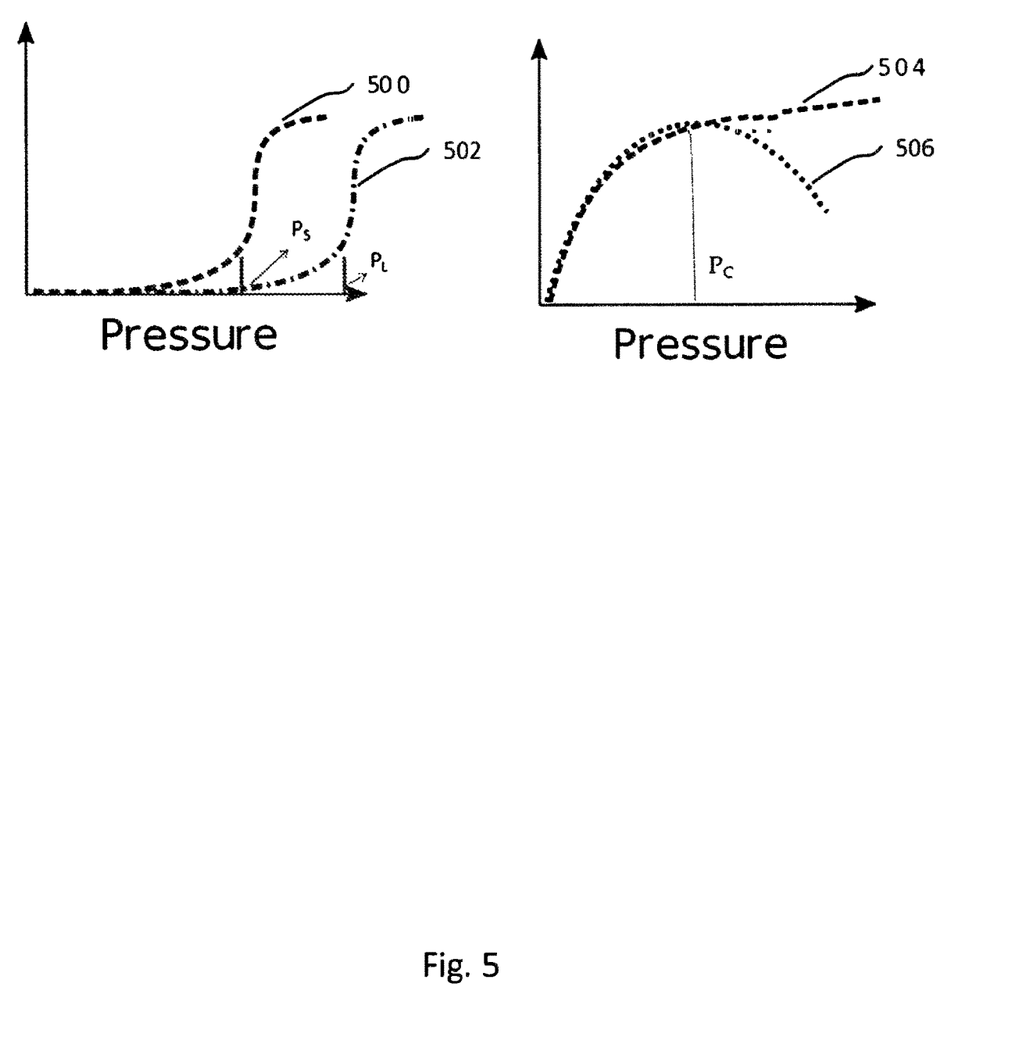
FIG. 5 contains graphs that illustrate differences of scattered responses between gas, liquid and solid phases in multiphase flowstreams of the embodiments.

FIG. 5 are graphs that illustrate characteristics of scattered responses of multiphase flow with different constituents according to the embodiments. Each graph shows the effects of pressure versus scattering response in a liquid flow stream. In a first graph, a scattering response curve 500 is from the liquid flow stream including sands only. This curve 500 shows a sharp increase $P_S$ of the response at a low pressure value. In contrast, the scattering response curve 502 of the same flow stream without including sands shows a higher pressure value where the sharp scattering response increase $P_L$ initiates. This difference results from the nature of homogeneous and heterogeneous nucleation. Therefore, by detecting the scattering signals from gradually increasing the excitation pressure, liquids with and without solid particles (e.g., sands) can be differentiated. In the case of both bubbles and sands presenting at the same time in the flow stream, the response curve is indicated by 504, which is different from the response curve 506 of a flow stream with bubbles only. Initial pressure responses in curves 504 and 506 indicate that the existing flow stream bubbles also generate strong scattering that masks the sand signals. When the excitation pressure increases, the scattering response $P_C$ from the liquid with sands and bubbles will continue to grow as shown in curve 504. Here, the sharp increase of the response is smeared out by the responses of the existing bubbles. However, if there is only bubble presence in the flow stream, the response curve will be plotted as a bell shape as indicated by curve 506. This is because of the nonlinear behaviors of bubbles at large pressure amplitudes, such as the transfer of energy at the fundamental frequency of other harmonic or sub-harmonic components.

Various embodiments of the present invention may incorporate one or more of these and the other features described herein. The following detailed description taken in conjunction with the accompanying drawings may provide a better understanding of the nature and advantages of the present invention. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications. While the invention has been described with a certain degree of particularity, it is manifest that many changes may be made in detail of construction and the arrangement of components without departing from the spirit and scope of this disclosure. The present disclosure is to be considered as an exemplification of the principles of the invention and is not intended to limit the invention to the specific embodiments illustrated herein by the figures or description above.

What is claimed is:

1. An ultrasonic characterization method for a flow stream to detect impurities, comprising:
    placing a first transducer and a second transducer aligned confocally to a flowstream;
    transmitting, from the first transducer, ultrasonic waveform signals into the flowstream;
    receiving, by the second transducer, the ultrasonic waveform signals;
    removing waveform signal reflections using a pitch-catch configuration of the first transducer and the second transducer;
    detecting waveform signals indicating impurities in the flowstream using induced nucleation of the impurities;
    detecting waveform signals indicating bubbles in the flowstream using nonlinear dynamic behaviors of the bubbles; and
    differentiating between the waveform signals of the impurities and the waveform signals of the bubbles using cavitation properties of the impurities and the bubbles.

2. The method of claim 1, wherein the detecting waveform signals indicating impurities includes sweeping an excitation pressure of the first transducer or the second transducer.

3. The method of claim 1, wherein the detecting waveform signals indicating impurities includes sweeping an excitation frequency of the first transducer or the second transducer.

4. The method of claim 1, wherein the differentiating between the waveform signals of the impurities and the waveform signals of the bubbles further includes a time domain cavitation signal analysis of the impurities waveform signals and the bubbles waveform signals.

5. The method of claim 1, wherein the differentiating between the waveform signals of the impurities and the waveform signals of the bubbles further includes a frequency domain cavitation signal analysis of the impurities waveform signals and the bubbles waveform signals.

6. An ultrasonic characterization system for a flowstream to detect impurities, comprising:
    a first transducer;
    a second transducer aligned confocally to the first transducer around a flow stream;
    a controller including a processor configured to execute commands to:
    transmit, from the first transducer, ultrasonic waveform signals into the flowstream;
    receive, by the second transducer, the ultrasonic waveform signals;
    remove waveform signal reflections using a pitch-catch configuration of the first transducer and the second transducer;
    detect waveform signals indicating impurities in the flowstream using induced nucleation of the impurities;
    detect waveform signals indicating bubbles in the flowstream using nonlinear dynamic behaviors of the bubbles; and
    differentiate between the waveform signals of the impurities and the waveform signals of the bubbles using cavitation properties of the impurities and the bubbles.

7. The system of claim 6, wherein the processor is further configured to execute commands to sweep an excitation pressure of the first transducer or the second transducer to detect the waveform signals indicating impurities.

8. The system of claim 6, wherein the processor is further configured to execute commands to sweep an excitation frequency of the first transducer or the second transducer to detect the waveform signals indicating impurities.

9. The system of claim 6, wherein the processor is further configured to execute commands to differentiate between the waveform signals of the impurities and the waveform signals of the bubbles further using a time domain cavitation signal analysis of the impurities waveform signals and the bubbles waveform signals.

10. The system of claim 6, wherein the processor is further configured to execute commands to differentiate between the waveform signals of the impurities and the waveform signals of the bubbles using a frequency domain cavitation signal analysis of the impurities waveform signals and the bubbles waveform signals.

* * * * *